Patented Jan. 6, 1925.

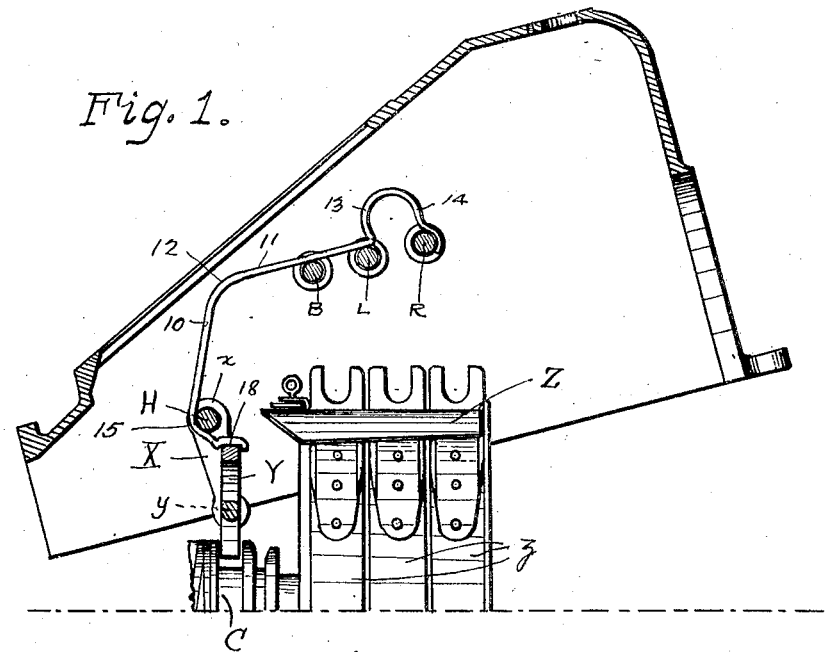
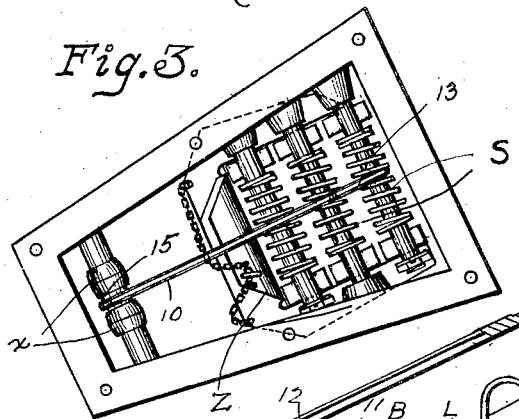
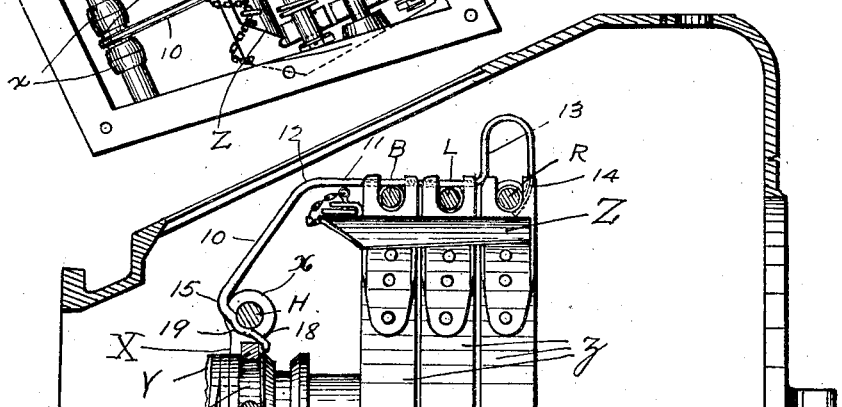

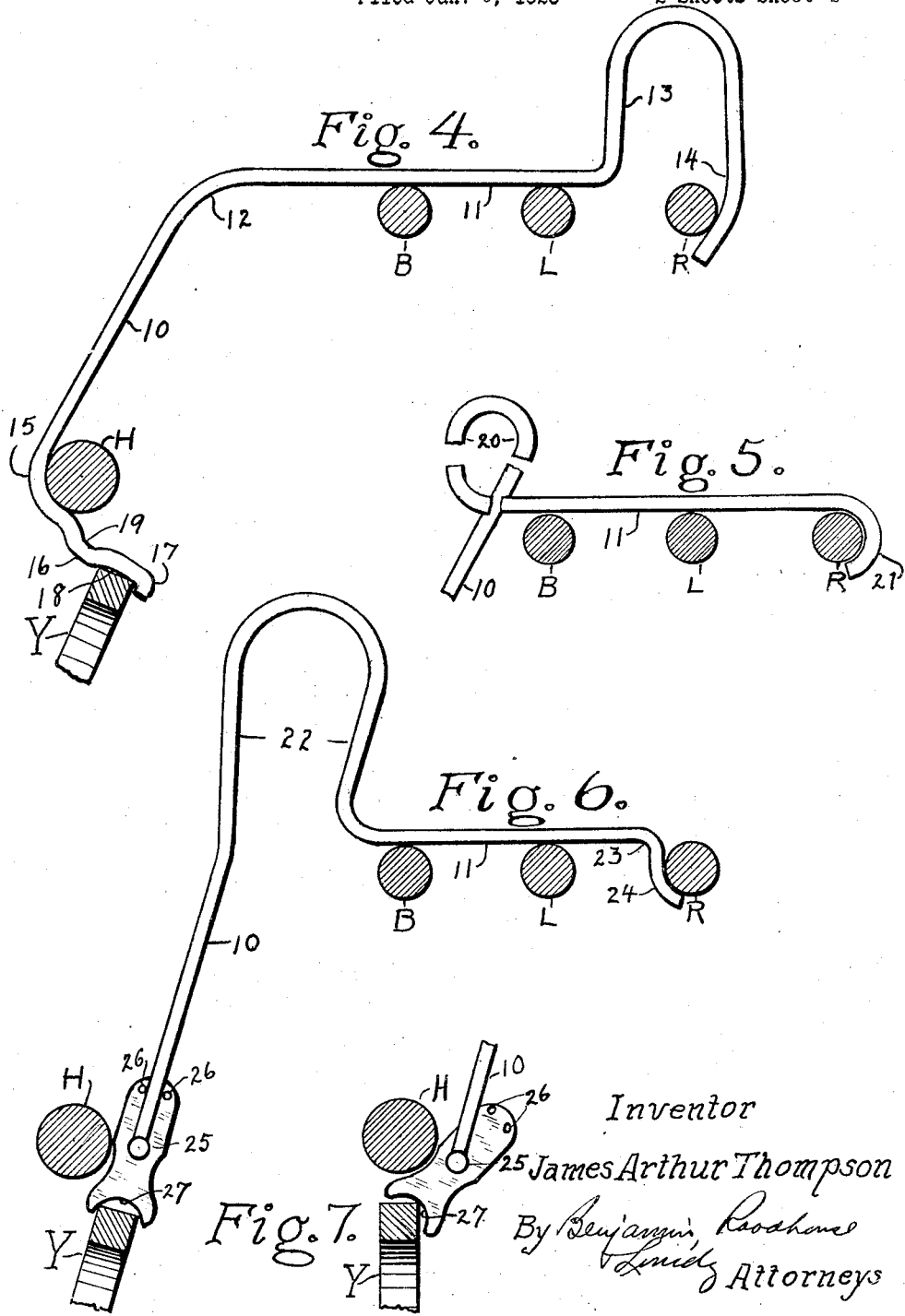

1,522,475

UNITED STATES PATENT OFFICE.

JAMES ARTHUR THOMPSON, OF RUSHVILLE, ILLINOIS, ASSIGNOR TO GLADACRES INCORPORATED, A CORPORATION OF ILLINOIS.

HOLDER FOR CLUTCH YOKES AND TRANSMISSION SPRINGS.

Application filed January 5, 1923. Serial No. 610,943.

*To all whom it may concern:*

Be it known that I, JAMES ARTHUR THOMPSON, a citizen of the United States, residing at Rushville, in the county of Schuyler and State of Illinois, have invented a new and useful Improvement in a Holder for Clutch Yokes and Transmission Springs, of which the following is a specification.

My present invention relates to devices for use in connection with the transmission mechanism of motor vehicles of the well known Ford type wherein the rotative motion of the engine crank-shaft is transmitted to the rear or driving axle (except in direct drive) through the medium of a plurality of spring bands that are adapted to be constricted around a corresponding number of drums, and thereby connect the crank-shaft with the transmission shaft.

In the Ford motor vehicle the operation of the bands is accomplished by rotating or rocking the respective spindles of the bands through the medium of foot pedals or levers, and said spindles and levers are mounted upon and journaled in bearings in a transmission cover that is usually bolted to the crank case and all these parts must be removed with the transmission cover whenever replacements or repairs are to be made to the bands and the drums. Also, in the Ford vehicle, in order to return the spindles and foot pedals to their normal positions coiled expansion springs are interposed between the operating lugs of the bands and suitably shaped wedges or cams are employed upon the spindles and their adjacent bearings in order to move the spindles bodily in a longitudinal or axial direction whenever the latter are rocked by the depression of the foot pedals. There are three of these foot pedals in the Ford control mechanism, the left hand pedal being the low speed, and it with its spindle is linked and operatively connected with a high-speed spindle which does not have a separate foot pedal but is thrown into operation whenever the low speed band is released after the vehicle has started to move forwardly. The high-speed spindle is positioned transversely above the transmission shaft and adjacent the latter it is provided with a pair of oppositely arranged downwardly extending segmental or crescent shaped arms in the free ends of which is journaled a horse-shoe or U-shaped yoke that coacts with a grooved collar of a clutch device that provides connection between the engine shaft and the transmission shaft when the high-speed mechanism is in use.

Whenever repairs, replacements, etc., have been made to the bands and other parts of the transmission, and it is desired to replace the cover which carries the spindles, foot pedals, etc., it is found there are twelve movable parts thereon which must be individually held in their respective positions, while the cover is being lowered into position, otherwise the parts will not assemble properly. Besides these twelve parts on the casing, the transmission bands, three in number, must be constricted and held in such position in order to permit the respective spindles to assemble therewith. In my prior pending application for Letters Patent of the United States, filed July 2, 1921, Serial Number 482,131, for an automobile tool, etc., I have shown a clamp for holding the bands in constricted position, and a bar co-operating with said clamp for preventing movement of the foot pedals and consequent rotation or rocking of the respective spindles, while the cover is being replaced upon the casing. The bar just mentioned successfully maintains six of the twelve movable parts on the cover against movement, to-wit:—the three spindles (brake, reverse and low speed) and their respective foot pedals. With my present invention I am able to maintain the clutch yoke on the high speed spindle in position for assembly with the groove in the clutch member on the shaft and also permit of a very slight rotation upon its journals which is incident to its assembling operation, and I am also able to maintain the coiled springs encircling the three control spindles against accidental longitudinal movement upon their respective spindles. My invention is so shaped that, whenever it is desired, these springs may be manually rotated upon the spindles for properly positioning them with respect to the lugs of the clamping bands. Thus it will be seen that with my present device I hold and maintain in desired position four of the remaining six loose elements or parts carried by the transmission cover, and when used in connection with the structure disclosed in my aforesaid pending application, practically all of the loose parts are held in the fixed positions for assembly, while the only loose or movable elements are the two washers adjacent the nuts carried upon the outer ends of the reverse and brake spindles, but as these washers will usually adhere to the nuts due to the viscosity of the oil and grease and will not ordinarily move except when the nuts are manually rotated there is little or no necessity for holding them temporarily during the assembly as is the case with the other parts.

My spring and yoke clamp I prefer to construct from a single piece of metal for simplicity in manufacture which materially reduces the cost of fabrication and consequently it can be sold to the user for a very moderate price. Also, it will be obvious from an inspection of the drawings that the structure is preferably made from wire or the like which may be readily shaped or bent to the desired form, and it is of such shape that when installed it may be readily removed from the spindles and yoke without permanent distortion.

I prefer to carry out my invention in substantially the manner hereinafter fully described, and as more particularly pointed out in the claims, reference being now had to the accompanying drawings that form a part of this specification, in which—

Fig. 1 is a view of the upper half of a Ford transmission with the cover to the crank case about to be assembled, showing my invention installed upon the spindles and yoke.

Fig. 2 is a view similar to Fig. 1 showing the relative position of the parts after the cover has been lowered upon the crank case.

Fig. 3 is a top view of the structure looking at the same at right angle to the plane of the hand-hole opening in the cover.

Fig. 4 is a transverse section or an end view of the spindles and yoke showing my clamp in assembly therewith, drawn to the full scale.

Fig. 5 is a fragmentary view of one end portion of a slightly modified form of my invention.

Fig. 6 is a view similar to Fig. 4 showing another modified form of my invention.

Fig. 7 is a fragmental view of the yoke engaging end of the structure showing the relative position of the yoke and holder when the former is about to be released.

Referring more particularly to Fig. 4, it will be seen my clamp preferably comprises a length of metal, preferably wire of round section, having substantially straight portions or members 10 and 11, and joined by an intermediate bend 12. The outer extremity of the portion or member 11 is bent laterally, as at 13, and then in an irregular curve 14 which provides a segmental or sickle shaped end or seat. The outer end of straight portion or member 10 is provided with a bend 15 from which extends a lateral portion that has, intermediate its ends, a hump 16 and its end 17 bent laterally again. The space between hump 16 and lateral end 17 provides a notch 18 upon one side of the wire, the purpose of which will hereafter more fully appear, and the portion of the wire back of hump 16 provides a small recess 19, also to be hereafter mentioned. In Fig. 5 the intermediate bend between straight portions 10 and 11 is in the form of a closed loop 20 so that the wire adjacent the loop crosses itself in the manner shown in said figure, and the outer end of the straight portion 11 has a hook-shaped extension 21 to provide an open seat, as seen in the drawings. In Fig. 6 the portion of the wire connecting straight pieces 10 and 11 is in the form of an open loop 22, and the end of straight portion 11 is bent laterally, as as 23, and then curves, as as 24. The outer end of straight portion 10 in this modification has a plate 25 pivotally mounted thereon, which plate is provided with slight projections or humps 26 back of its pivot and has a recess 27 in its outer end to provide an open seat for the part to be engaged.

The structures hereinbefore described are mounted upon the spindles of the transmission in the manner shown in the drawings:—That is, the straight portion 11 of the clamp rests upon the upper segments of the brake and lower speed spindles B and L, respectively, between the convolutions of the expansion springs S, and the curved end portion of the straight member 11 engages and seats against the reverse spindle R also between the convolutions of the coiled spring thereon. The bend 15 in the outer portion of straight member 10 is positioned upon and partly surrounds the high speed spindle H between the bosses $x$ of the arms X that carry the pivotal members $y$ of the U-shaped yoke Y. After positioning the clamp in the manner described, the yoke is rotated in either direction upon its journals or pivots $y$ in the lower ends of arms X so as to position its segmental or connecting portion in the notches 18 adjacent the lower end of the clamp. Thus, the clamp maintains the springs and the yoke in desired position for assembly with the transmission. By employing the pedal lock bar and the band clamp Z of my aforesaid pending application to maintain, respectively, the pedals against movement, and to constrict the transmission bands $z$, said spindles and bands may be maintained in their relative positions for assembly with each other when the cover is lowered to the crank case. The yoke Y must be inserted in the groove of clutch member C during the initial lowering of the transmission cover, as seen in Fig. 1, and, owing to the peculiar construction of the Ford type of vehicle, the cover must be in a tilted position, as shown in Fig. 1, during this initial movement. After it is lowered so that its rear portion (the left hand end in Fig. 1) engages the crank case, the opposite end of the cover is further lowered until it is in proper position. This naturally causes a relative rotation of yoke Y with respect to its carrier arms X and in so doing the clamp is moved with respect to the spindle H so that the notch or depression 19 engages said spindle, instead of bend 15, as seen in dotted lines in Fig. 4. After the cover has been assembled with the crank case and the spindles and yoke with their respective elements, my clamp may be readily removed by lifting the outer end of member 11 and disengaging its end from the reverse spindle R. The outer end of member 10, which had theretofore been engaged with yoke Y and high speed spindle H, may then be removed by withdrawing the device horizontally from engagement therewith and the whole clamp passed out through the handhole in the cover.

In the modification shown in Fig. 6 the irregularly shaped plate 25 will rock slightly on the end of straight member 10 when yoke Y has been moved upon its pivot in the final movement of the assembly heretofore described, the projections 26 being utilized to normally position the structure, as seen in Fig. 6, during the initial movement. The removal is obtained by compressing the open bend 22 which removes the seats from their respective elements.

What I claim is:

1. A yoke and spring clamp for Ford transmissions comprising a length of wire one end thereof provided with a hooked portion to engage one of the pedal spindles, and the other end having means thereon for engaging and maintaining the clutch yoke of the transmission in position.

2. A yoke and spring clamp for Ford transmissions comprising a length of wire one end thereof provided with a hooked portion to engage one of the pedal spindles, and the other end having means for engagement with the high speed spindle to support said clamp and for engaging and maintaining the clutch yoke of the transmission in position.

3. A yoke and spring clamp for Ford transmissions comprising a structure having oppositely arranged oblique arms, the outer end of one arm formed in a hook to engage one of the transmission spindles; the other arm having a laterally bent portion at its outer end that is provided with a notch to receive an adjacent portion of the clutch yoke.

4. A yoke and spring clamp for Ford transmissions comprising a length of wire bent at one end to provide a lateral element to engage one of the transmission spindles and the opposite end of the wire provided with a lateral extension; said extension having a notch therein to receive an adjacent portion of the clutch yoke.

5. A yoke and spring clamp for Ford transmissions comprising a length of wire bent intermediate its ends to provide converging substantially straight members, one of said members adapted to engage the convolutions of the springs upon the control pedal spindles of the transmission, the outer end of the other member having a lateral extension that is provided with a notch intermediate its ends to receive an adjacent portion of the clutch yoke of the transmission.

6. A yoke and spring clamp for Ford transmissions comprising a length of wire one end thereof provided with a hooked portion to engage one of the pedal spindles, and the other end having means thereon for engaging and maintaining the clutch yoke of the transmission in position; said wire provided intermediate its ends with a spring loop.

7. A yoke and spring clamp for Ford transmissions comprising a length of wire, a portion thereof shaped to engage the transmission spindles between the convolutions of the springs thereon, the opposite end portion of the wire being disposed laterally thereto and provided with a notch adjacent its end to engage the clutch yoke; said lateral portion also provided with a recess upon the side opposite to and adjacent said notch whereby movement of the yoke will shift the relative position of the lateral portion with respect to elements that support the yoke.

Signed at Chicago, county of Cook, and State of Illinois, this 22nd day of December, 1922.

JAMES ARTHUR THOMPSON.